United States Patent [19]

Nan-Lin

[11] Patent Number: 5,137,499
[45] Date of Patent: Aug. 11, 1992

[54] SHIELD OF BELTED WHEEL OF A COMPOUND MACHINE

[76] Inventor: Biing Nan-Lin, No. 39, Yi-Shin 6 St, Tai-Ping, Taichung, Taiwan

[21] Appl. No.: 710,008

[22] Filed: Jun. 4, 1991

[51] Int. Cl.$^5$ ............................................. F16H 57/02
[52] U.S. Cl. .................................... 474/144; 474/146
[58] Field of Search ................................ 474/144–147

[56] References Cited

U.S. PATENT DOCUMENTS

| | | | |
|---|---|---|---|
| 1,903,120 | 3/1933 | Lafferty | 474/146 |
| 2,295,582 | 8/1942 | Ingwer | 474/144 X |
| 3,885,471 | 5/1975 | Morine et al. | 474/144 |
| 4,648,855 | 3/1987 | Palloch et al. | 474/144 |

Primary Examiner—Thuy M. Bui

[57] ABSTRACT

An improved shield of belted wheel of a compound machine comprises mainly a slide hole disposed at an appropriate location of upper portion thereof and a slide cover positioned correspondingly to the slide hole. The slide cover is characterized in that it comprises two rails located at lateral sides of bottom surface thereof to permit the slide cover to move along the confines of the slide hole in such a way that there is a sufficient open space in the slide hole to allow the shield to be lifted through the main shaft. The shield can be therefore opened up and closed with ease and speed.

2 Claims, 5 Drawing Sheets

SHIELD OF BELTED WHEEL OF A COMPOUND MACHINE

BACKGROUND OF THE INVENTION

The present invention relates to the belted wheel of a compound machine, and more particularly to an improved shield of belted wheel of a compound machine, which is designed to facilitate easy and speedy adjustment and replacement of the belted wheel.

A compound machine is a multi-purpose machinery used widely by various manufacturing industries. Therefore, the speed of the belted wheel of a compound machine is subject to frequent adjustment in accordance with specific applications of the compound machine.

The belted wheel of a prior art compound machine is inherently deficient in that its shield has to be entirely detached from the machine in order to permit an operator to adjust the speed of the belted wheel or to replace the belted wheel. In addition, the task of removing the shield is so cumbersome that two operators are often called for. Furthermore, it is often troublesome for machine operators to find an appropriate floor space in the shop to put the removed shield.

SUMMARY OF THE INVENTION

It is, therefore, the primary objective of the present invention to provide a compound machine with a shield which can be opened up easily and speedily to facilitate an adjustment of speed of the belted wheel or a replacement of the belted wheel.

In keeping with principles of the present invention, the primary objective of the present invention is accomplished by an improved shield of belted wheel of a compound machine, which comprises mainly a slide hole disposed at an appropriate location of upper portion thereof and a slide cover positioned correspondingly to the slide hole. The slide cover is characterized in that it comprises two rails located at lateral sides of bottom surface thereof to permit the slide cover to move along the confines of the slide hole in such a way that there is a sufficient open space in the slide hole to allow the shield to be lifted through the main shaft. The shield can be therefore opened up and closed with ease and speed.

DESCRIPTION OF THE PREFERRED EMBODIMENTS

Figure 1:
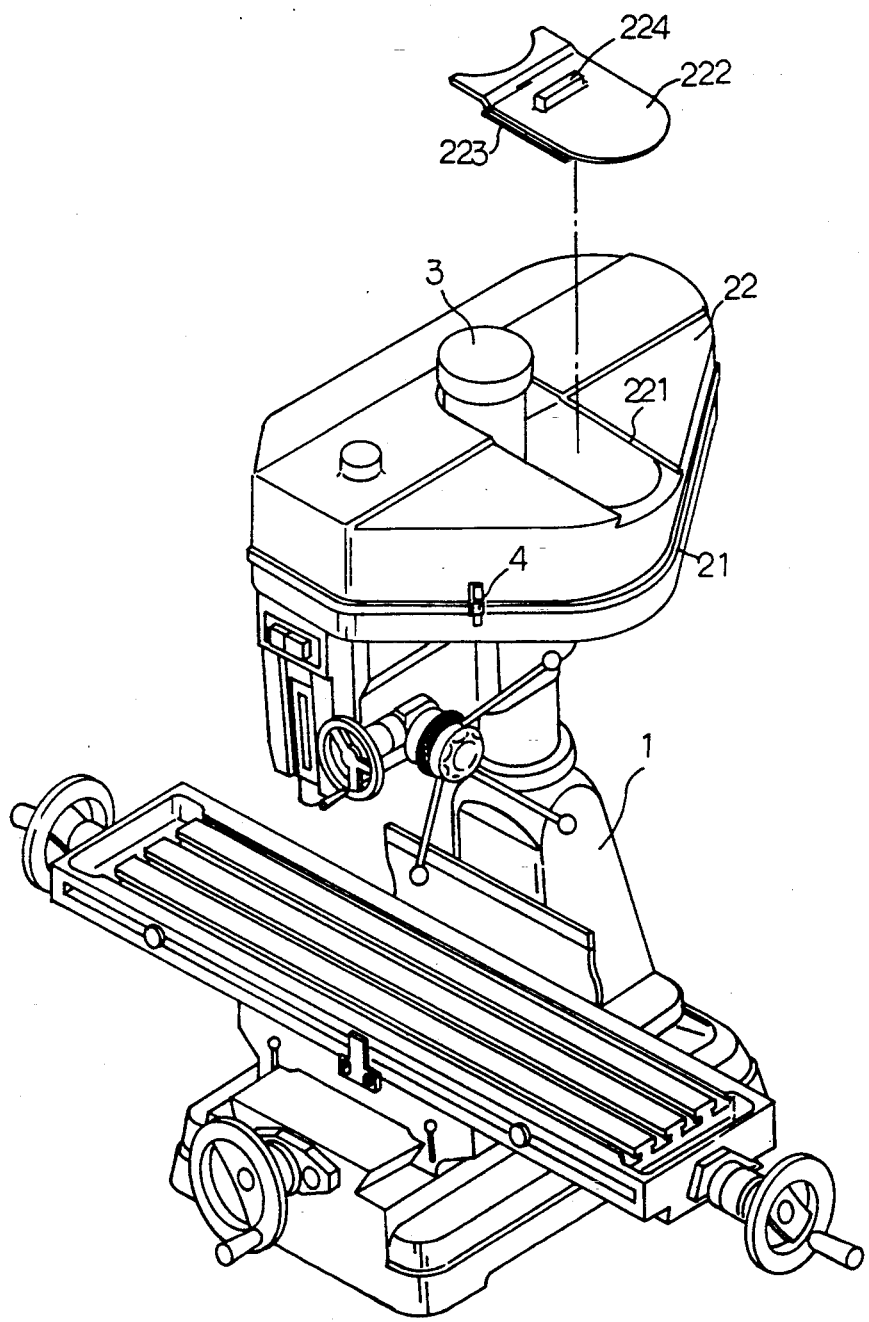
FIG. 1 shows an exploded view of the preferred embodiment of the present invention.
Figure 2:
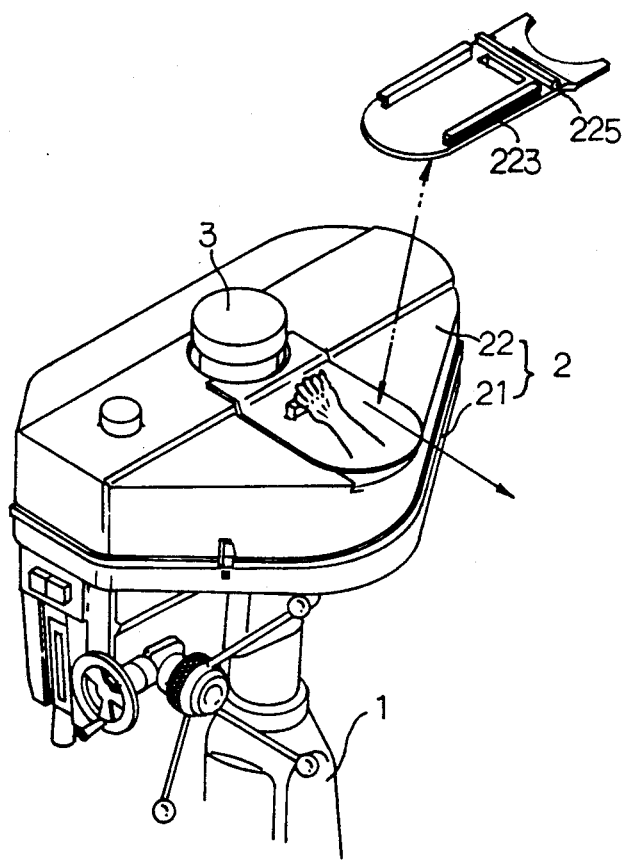
FIG. 2 shows a three-dimensional view of the preferred embodiment of the present invention.
Figure 3:
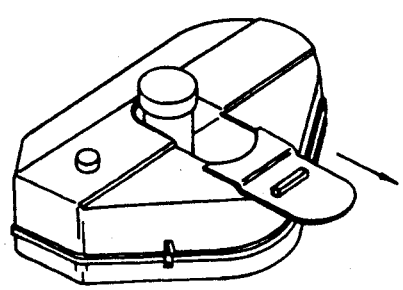
FIGS. 3 and 4 show three-dimensional views of the preferred embodiment of the present invention.
Figure 4:
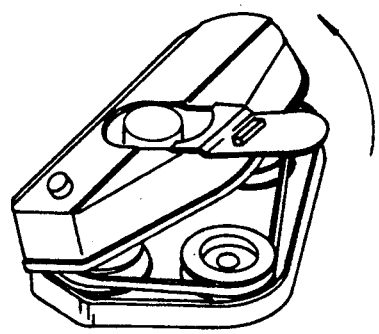

Referring to FIGS. 1 and 2, the compound machine 1 embodied in the present invention is shown comprising a head drive portion 2, which in turn consists of a shield base 21 and a shield 22. The driving elements of the head drive portion 2 are mounted on the shiled base 21 and are housed under the shield 22, which is composed of a slide hole 221 and a slide cover 222. The slide hole 221 of the shield 22 is disposed at an appropriate location of the upper portion of the shield 22 so as to permit the main shaft 3 to emerge from the slide hole 221 and to make an up-and-down movement. Located correspondingly to the slide hole 221 is a slide cover 222, which is composed of two rails 223 located at both lateral sides of the bottom surface thereof and a handle 224 located at the upper surface thereof. The rails 223 serve to facilitate the movement of the slide cover 222 along the confines of the slide hole 221. In addition, the slide cover 222 has a fender 225 disposed at the bottom surface thereof. The shield wall 226 serves to obstruct the fender 225 in order to prevent the slide cover 222 from slipping out of the shield 22. A fastener 4 is arranged between the shield 22 and the shield base 21 to ensure that they engage securely and that the shield 22 is not opened up accidentally.

The principle of operation of the present invention is expounded hereinaften.

Figure 5B:
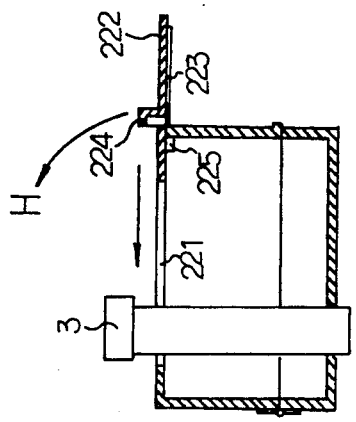
FIGS. 5A, 5B, 5C, and 5D are schematic views of the preferred embodiment in action according to the present invention.
Figure 5D:
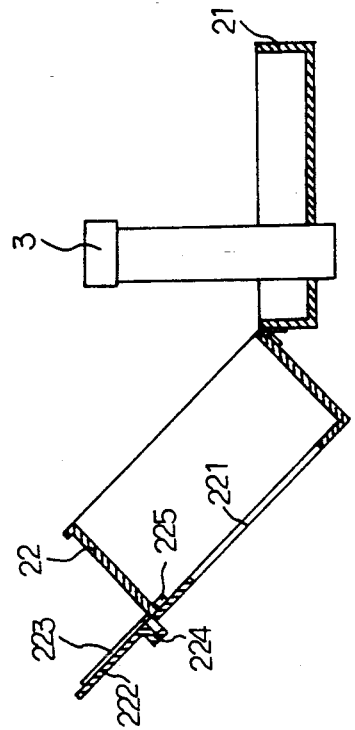
Figure 5A:
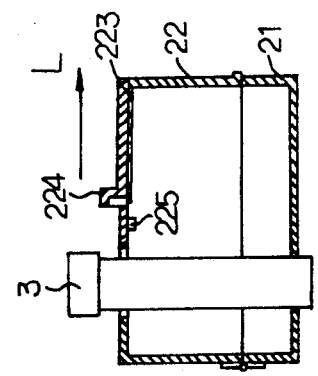
Figure 5C:
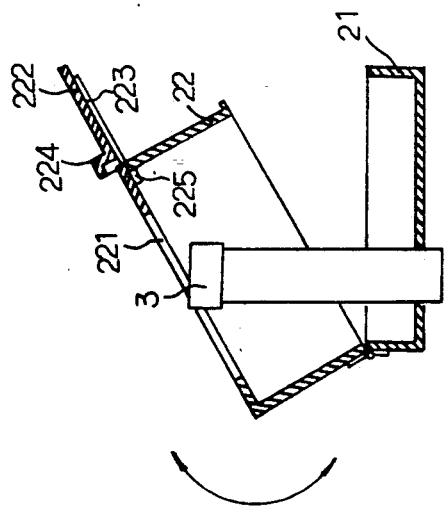

As shown in FIG. 5, the shield has been opened up and the slide cover 222 is moved in a direction indicated by an L arrow, as shown in FIG. 5A. As a result of the slide cover 222 having been moved to one side of the slide hole 221, there is a sufficient room in the slide hole 221 to allow the shield 22 to pass through the main shaft 3. Thereafter, the shield 22 is lifted in a direction indicated by the H arrow, as shown in FIG. 5B. Finally, the shield 22 is placed in positions shown in FIGS. 5C and 5D. After a machine operation has completed the job of adjusting the speed of the belted wheel or of replacing the belted wheel, he or she may close the shield 22 in a reverse direction.

Figure 6:
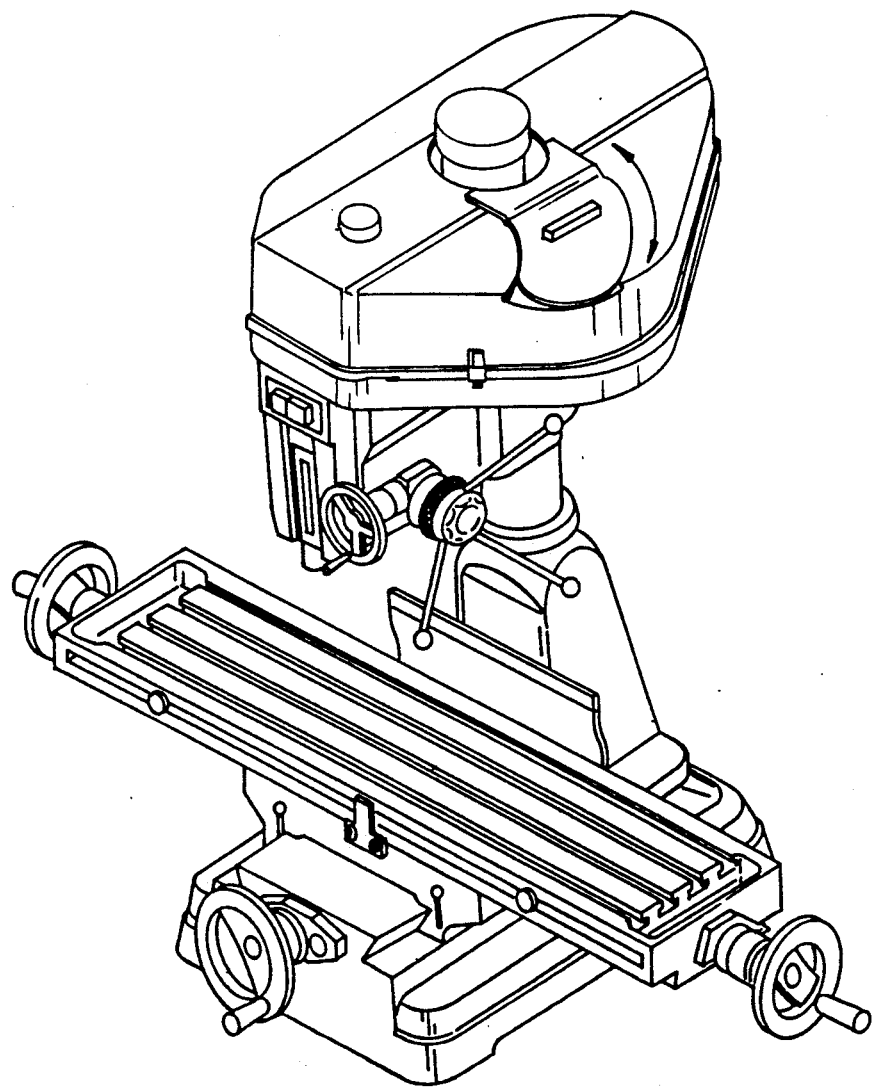
FIG. 6 shows a schematic view of the first preferred embodiment of the present invention.
Figure 7:
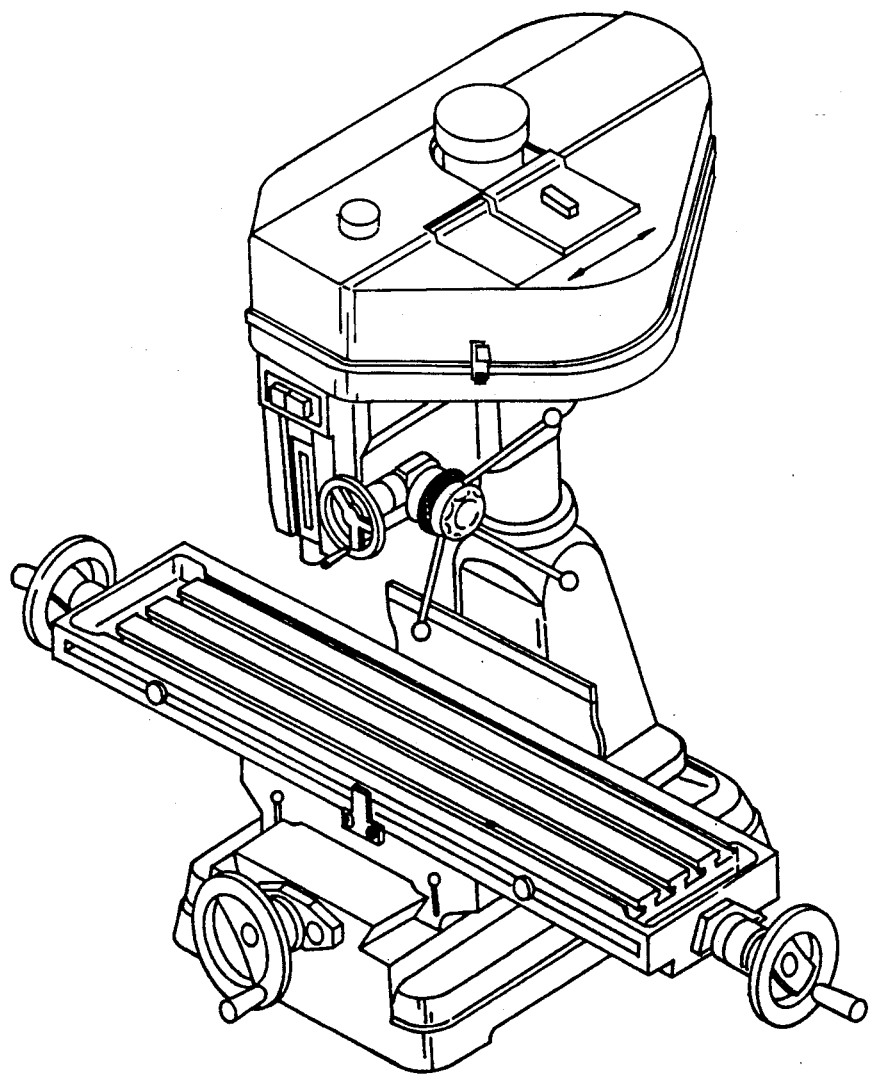
FIG. 7 shows a schematic view of the second preferred embodiment of the present invention.

The embodiment of the present invention described above is to be considered in all respects as merely illustrative and not restrictive. Accordingly, the present invention may be embodied in other specific forms without deviating from the spirit thereof. For example, the slide hole 221 of the shield 22 may be constructed in other modes or forms, as shown in FIGS. 6 and 7. Therefore, the present invention is to be limited only by the scope of the hereinafter appended claims.

I claim:

1. An improved shield of belted wheel of a compound machine comprising a slide hole disposed at an appropriate location of upper portion thereof and a slide cover positioned correspondingly to said slide hole, with said slide cover characterizing in that it comprises two rails located at lateral sides of bottom surface thereof to permit said slide cover to move along the confines of said slide hole in such a way that there is a sufficient open space in said slide hole to allow the shield to be lifted through the main shaft.

2. An improved shield of belted wheel of a compound machine in accordance with claim 1, wherein said slide cover further comprises a fender disposed at one side of side rails.

* * * * *